United States Patent [19]

Grant

[11] Patent Number: 4,694,852
[45] Date of Patent: Sep. 22, 1987

[54] FLOW REGULATING VALVE FOR CONTROLLING THE FLOW OF CORROSIVE FLUIDS

[75] Inventor: Robert W. Grant, Pleasanton, Calif.

[73] Assignee: FSI Corporation, Chaska, Minn.

[21] Appl. No.: 868,568

[22] Filed: May 30, 1986

Related U.S. Application Data

[63] Continuation-in-part of Ser. No. 693,127, Jan. 22, 1985, abandoned.

[51] Int. Cl.⁴ .............................................. G05D 7/01
[52] U.S. Cl. ....................................... 137/501; 92/245
[58] Field of Search ................... 137/500, 501; 92/240, 92/245

[56] References Cited

U.S. PATENT DOCUMENTS

| 569,781 | 10/1896 | Brown | 137/501 |
| 2,915,084 | 12/1959 | Taylor | 137/501 |
| 3,272,079 | 9/1966 | Bent | 92/240 |
| 3,643,685 | 2/1972 | Hays | 137/501 |
| 3,729,018 | 4/1973 | Butterfield | 137/501 X |

FOREIGN PATENT DOCUMENTS 1355789  6/1974  United Kingdom .................. 92/240

Primary Examiner—Robert G. Nilson
Attorney, Agent, or Firm—Faegre & Benson

[57] ABSTRACT

A fluid flow regulating valve for controlling the flow of a corrosive fluid, the valve including an axially unrestrained movement of the piston in accordance with the fluid flow varies the effective size of a flow control orifice to regulate the fluid flow.

7 Claims, 6 Drawing Figures

FLOW REGULATING VALVE FOR CONTROLLING THE FLOW OF CORROSIVE FLUIDS

BACKGROUND OF THE INVENTION

This appplication is a continuation in part of application Ser. No. 06/693,127 entitled "Flow Control" filed Jan. 22, 1985, now abandoned and assigned to the same assignee as this invention.

1. Field of the Invention

This invention relates to an improved regulating valve for controlling, the flow of corrosive fluids, a valve that is simple in its design and reliable in its operation. More particularly, the invention relates to a regulating valve whose component parts can be made advantageously of corrosive resistant plastic materials.

2. Description of the Prior Art

In certain applications, such as that disclosed in my co-pending application Ser. No. 06/693,133, filed Jan. 22, 1985, entitled "Bulk Dispensing of Chemicals", and assigned to the same assignee as this invention, it is necessary to regulate the flow of corrosive liquid chemicals to maintain a constant flow despite widely varying input pressure to the regulator.

As will be appreciated by those skilled in the art, prior flow control valves are not well suited for use with corrosive chemicals such as hydrochloric acid, dilute hydrogen peroxide. Materials used in the typical prior art valves are attacked by the corrosive material. Certain fluoropolymer plastics are not adversely affected by the chemicals but engineering limitations make it impractical, to make prior art flow regulating valves out of such plastic materials, including perfluoroaldoxy plastic known as Teflon (a trademark of DuPont Corporation).

SUMMARY OF THE INVENTION

One object of this invention is the provision of a simple, reliable, regulating valve designed to be made of a suitable corrosive resistant plastic material.

Briefly, this invention contemplates the provision of a plastic regulating valve which has an axially unrestrained piston with an integrally formed sealing ring. Movement of this piston varies the effective size of a control aperture located along a fluid flow passage in a solid valve body.

BRIEF DESCRIPTION OF THE DRAWINGS

The invention will now be described in greater detail in connection with the following drawings, in which.

DETAILED DESCRIPTION OF THE PREFERRED EMBODIMENTS

Figure 1:
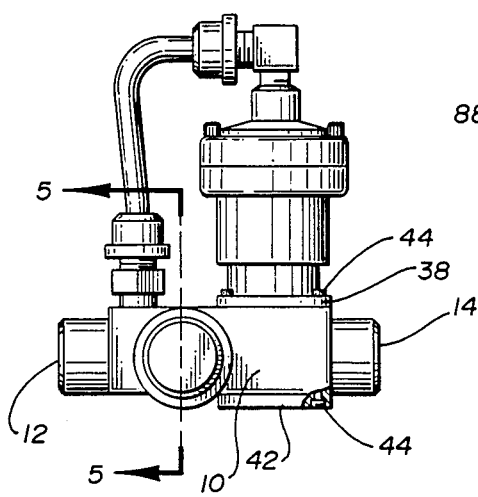
FIG. 1 is a front elevation of one embodiment of a flow control valve constructed in accordance with the teachings of this invention.
Figure 2:
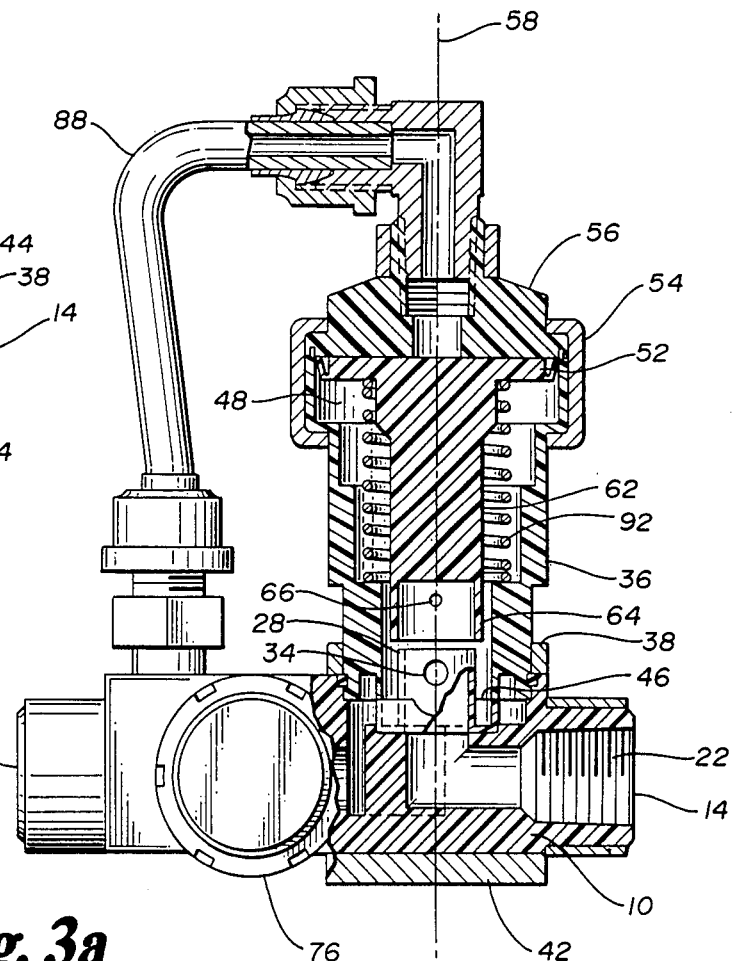
FIG. 2 is another front elevation of the valve shown in FIG. 1, with parts shown in section.

Referring now to FIGS. 1 and 2, in a preferred embodiment of the invention, there is a solid valve body 10 with an inlet 12 and an outlet 14. Preferably, the valve body is made from a solid Teflon block with the various passages machined therein.

Figure 3B:
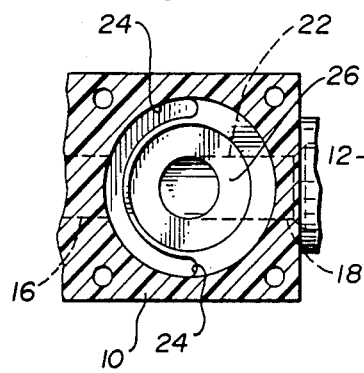
FIGS. 3a and 3b are respectively a sectional perspective view of part of the body of the valve shown in FIGS. 1 and 2 and a sectional plan view of part of the body.
Figure 3A:
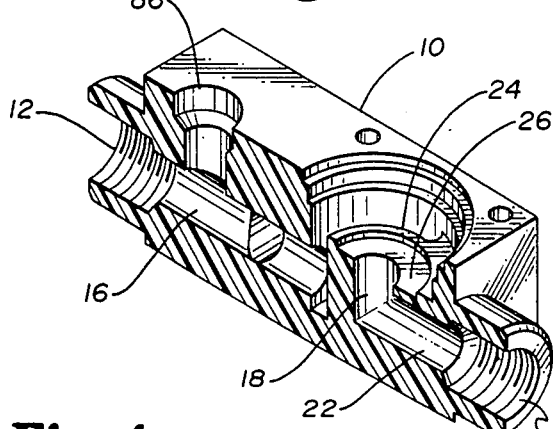
Figure 4:
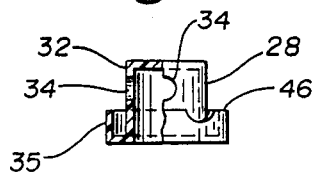
FIG. 4 is a detailed view of a control element used in the valve described in connection with FIG. 2.

As shown most clearly in FIG. 3a, the valve body 10 has a number of intersecting bores which form a passage for fluid between the inlet 12 and outlet 14. With respect to the orientation of valve shown in FIGS. 1 and 2, the bores include a horizontal bore 16, a vertical bore 18 and another horizontal bore 22 which intersects bore 18. A passage way 24 partially surrounds the bore and allows fluid flow between bores 16 and 18. A control element 28 sits in an angular recess 26 formed at the top of bore 18 and is thus disposed in the fluid flow passageway between the inlet 12 and the outlet 14. The control element 28 has a cylindrical wall 32 in which are formed a plurality of flow control orifices 34.

A fluid-tight housing 36 is secured to the body 10 by means of an upper plate 38, a lower plate 42, and screws 44. The housing 36, which is preferably Teflon, and which may be formed by injection molding, engages the top 46 of a ring 35 integrally formed with the control element 28 and thusly secures the control element in the recess 26 at the top of the bore 18. The top surface of ring 35 has a series of cutouts to allow fluid flow between the housing 36 and the ring 35.

The upper portion of the housing 36 forms a chamber 48 in which rides an axially unrestrained piston 52. A retaining ring 54 secures a head cap 56 to the housing 36 making the chamber 48 fluid tight.

The piston 52 has a radially resilient peripheral ring which engages the inner wall of the chamber 48, and forms a fluid-tight seal while permitting motion of the piston 52 along a longitudinal axis 58 which passes through the center of the piston and the axis of rotation of the cylindrical wall 32 of the control element 28.

The piston is preferably made of Teflon and the integral resilient ring 52 can be formed by machining a groove in the piston. It should be noted that the design of the ring is such that the pressure differential across it tends to urge it into enegagement with the wall of the chamber.

A valve stem 62 formed integrally with the piston has a cylindrical recess 64 which slidably engages the outer surface of the cylindrical control element 28. The recess 64 provides a control surface which varies the effective size of the orifices 34 as the piston 52 moves up and down in the chamber 48. An orifice 66 in the wall of recess 64 prevents a buildup of pressure therein.

Figure 5:
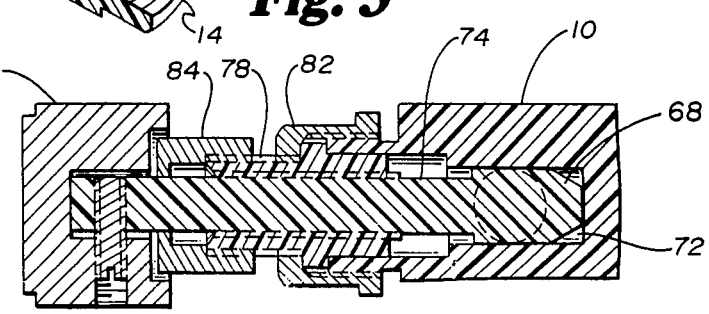
FIG. 5 is a section view taken along the line 5—5 of FIG. 1 and shows a variable flow restriction for generating a pressure differential proportional to the flow.

Referring now to FIG. 5, a tapered plug 68 fits in a bore 72 in the housing 10. The bore 72 intersects the bore 16 and tapered plug 68, which can slide into and out of the bore 72, provides a variable flow restriction in passage 16. This creates a differential pressure between the upstream side and the downstream side of the plug 68 which differential is proportional to the flow rate in passage 16.

The plug 68 has an integrally-formed stem 74 which is used to slide the plug in and out of the bore 72. A handle 76 is secured to the stem 74. A sleeve 78, a retaining ring 82 and a nut 84 secure the plug and stem to the housing and provides a fluid-tight seal while allowing movement of the plug 68.

Suitable fittings connect a bore 86 in block 10 to a Teflon tube 88 in order to couple the pressure upstream of the plug 68 through a bore in the cap 56 to the chamber 48 on the upper side of piston 52. The pressure downstream of the plug 68 is coupled to the chamber 48 on the lower side of piston 52 via passage 24 and housing 36. A Teflon coated compression spring 92 biases the piston to a position in which the control orifices 34 are unobstructed.

In operation, the input 12 is coupled to a corrosive chemical source under relatively high pressure. The pressure drop across the plug 68 is adjusted by moving the plug in bore 72 or until the piston 52 moves to a position where the control surface 64 allows a desired flow through orifices 34. Increases or decreases in the input pressure cause a variation in the flow which changes the differential pressure across plug 68 and cause movement of piston 52 to reestablish the desired flow rate. The circular ports 34 in the valve element 32 provide a control function which is nonlinear with respect to the movement of the piston 52 thus providing a close degree of regulation over a wide variation in input or output pressure.

Thus it will be appreciated that the objects of the invention have been accomplished. The valve is simple and reliable in its operation. All of the component parts exposed to corrosive fluids can be advantageously made of Teflon, with the exception of the compression spring 92 which can be conveniently Teflon coated. The integrally formed, radially resilient ring provides a seal for the movable piston and eliminates the need for a fixed diaphragm.

What is claimed is:

1. A fluid flow regulating valve for controlling the flow of a corrosive fluid, comprising:
    a solid valve body having an inlet, an outlet, and a plurality of intersecting bores in said body forming a passage for flow between said inlet and said outlet;
    a flow controlling orifice in said passage said element comprising a cylindrical wall with at least one fluid control orifice in said wall;
    a fluid-tight chamber having an interior wall surface;
    a movable piston disposed in said chamber, said piston having an integrally formed radially resilient sealing ring around its periphery engaging the interior wall surface of said chamber;
    means for generating a first and second fluid pressure whose difference is proportional to said fluid flow;
    means for coupling said first pressure to said chamber on one said piston;
    means for coupling said second pressure to said chamber on the other side of said piston;
    a valve stem connected to said piston; and
    a cylindrical recess in said stem forming a control surface in sliding engagment with said cylindrical wall whereby movement of said piston causes said control surface to move across said fluid control orifice.

2. A flow regulating valve as in claim 1 wherein the effective size of said orifice varies non-linearly with movement of said piston.

3. A flow regulating valve as in claim 1 wherein said piston is a corrosive resistant plastic material.

4. A flow regulating valve as in claim 3 wherein said valve body and said fluid-tight chamber are a corrosive resistant plastic material.

5. A fluid flow regulating valve for controlling the flow of a corrosive fluid, comprising:
    a solid valve body having an inlet, an outlet and a plurality of intersecting bores in said body forming a passage for fluid flow between said inlet and said outlet;
    a flow control element disposed in said passage, said element comprising a cylindrical wall with at least one fluid control orifice in said wall;
    a fluid-tight housing forming a cylindrical chamber aligned with said control element;
    a movable piston in said chamber, said piston having an integrally formed radially resilient sealing ring around its periphery engaging an interior wall surface of said chamber;
    means for generating a first and second fluid pressure whose difference is proportional to said fluid flow;
    means for coupling said first pressure to said chamber on one side of said piston;
    means for coupling said second pressure to said chamber on the other side of said piston;
    a valve stem connected to said piston; and
    a cylindrical recess in said stem forming a control surface in sliding engagement with said cylindrical wall whereby movement of said piston causes said control surface to move across said fluid control orifice.

6. A flow regulating valve as in claim 5 wherein said piston is a corrosive resistant plastic material and said stem is formed integrally with said piston.

7. A flow regulating valve as in claim 6 wherein said valve body and said fluid-tight chamber are a corrosive resistant plastic material.

* * * * *